United States Patent
Sugiyama et al.

(10) Patent No.: US 6,906,316 B2
(45) Date of Patent: Jun. 14, 2005

(54) SEMICONDUCTOR DEVICE MODULE

(75) Inventors: Osamu Sugiyama, Nagano (JP); Akio Izumi, Nagano (JP); Toshio Yamamoto, Nagano (JP)

(73) Assignee: Fuji Electric Co., Ltd. (JP)

( * ) Notice: Subject to any disclaimer, the term of this patent is extended or adjusted under 35 U.S.C. 154(b) by 308 days.

(21) Appl. No.: 10/367,612

(22) Filed: Feb. 14, 2003

(65) Prior Publication Data

US 2003/0173500 A1 Sep. 18, 2003

Related U.S. Application Data

(63) Continuation-in-part of application No. 10/004,269, filed on Oct. 24, 2001, now Pat. No. 6,583,433.

(30) Foreign Application Priority Data

Oct. 27, 2000 (JP) ........................................ 2000-327922
Jun. 11, 2002 (JP) ........................................ 2002-169992

(51) Int. Cl.$^7$ ............................................... H01J 5/02
(52) U.S. Cl. .................................... 250/239; 250/214.1
(58) Field of Search ............................. 250/239, 214.1, 250/208.1, 216, 551; 257/432, 433, 676, 684

(56) References Cited

U.S. PATENT DOCUMENTS

| | | | |
|---|---|---|---|
| 5,166,533 A | 11/1992 | Kajiwara | .................... 250/561 |
| 5,225,689 A | 7/1993 | Buckle et al. | .............. 250/561 |
| 5,715,043 A | 2/1998 | Hasegawa et al. | ......... 356/3.14 |
| 6,046,795 A | 4/2000 | Sugiyama et al. | ......... 356/3.14 |
| 6,308,015 B1 | 10/2001 | Matsumoto | .................. 396/106 |
| 6,337,736 B1 | 1/2002 | Sugiyama et al. | ......... 356/3.14 |
| 6,506,624 B2 * | 1/2003 | Tatoh et al. | ................ 438/106 |

FOREIGN PATENT DOCUMENTS

| | | |
|---|---|---|
| JP | 61-214566 | 9/1986 |
| JP | 2000-230856 | 8/2000 |
| KR | 2002-33074 | 5/2002 |

OTHER PUBLICATIONS

U.S. Appl. No. 10/004,269; filed Oct. 24, 2001; Osamu Sugiyama et al.; Range Finder Structure Allowing Easier Filling of the Transparent Filler.
U.S. Appl. No. 09/455,937; filed Dec. 7, 1999; Semiconductor Optical Sensing Apparatus.

* cited by examiner

Primary Examiner—Que T. Le
(74) Attorney, Agent, or Firm—Kimms & McDowell LLP

(57) ABSTRACT

A semiconductor device module is provided that prevents adhesion defects from causing in bonding a semiconductor sensor chip to a sensor stage with an adhesive and improving the reliability thereof. The semiconductor device module includes a sensor stage and a semiconductor optical sensor chip mounted on the sensor stage. The sensor stage includes a U-groove formed in an upper central surface portion of a bottom wall thereof. The sensor chip is bonded to the sensor stage with a thermosetting and UV-curing adhesive coated in the U-groove. The U-groove, includes an island-shaped flat pedestal located at a central bottom portion of the U-groove for mounting the sensor chip thereon. Pins are preferably disposed on both sides of the pedestal to hold the sensor chip horizontally, and the side walls of the U-groove 3b are preferably slanted such that the adhesive coated in the U-groove is prevented from splashing to the outside.

7 Claims, 4 Drawing Sheets

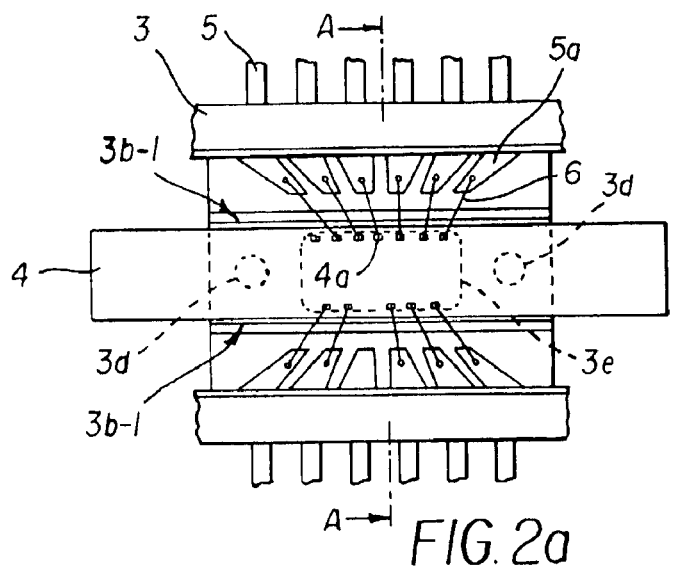
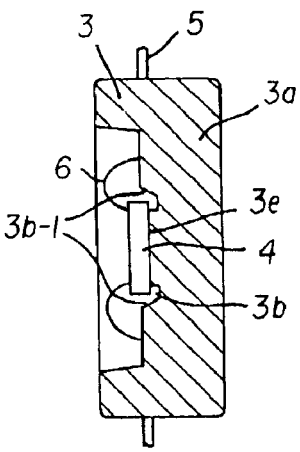
FIG. 2a    FIG. 2b
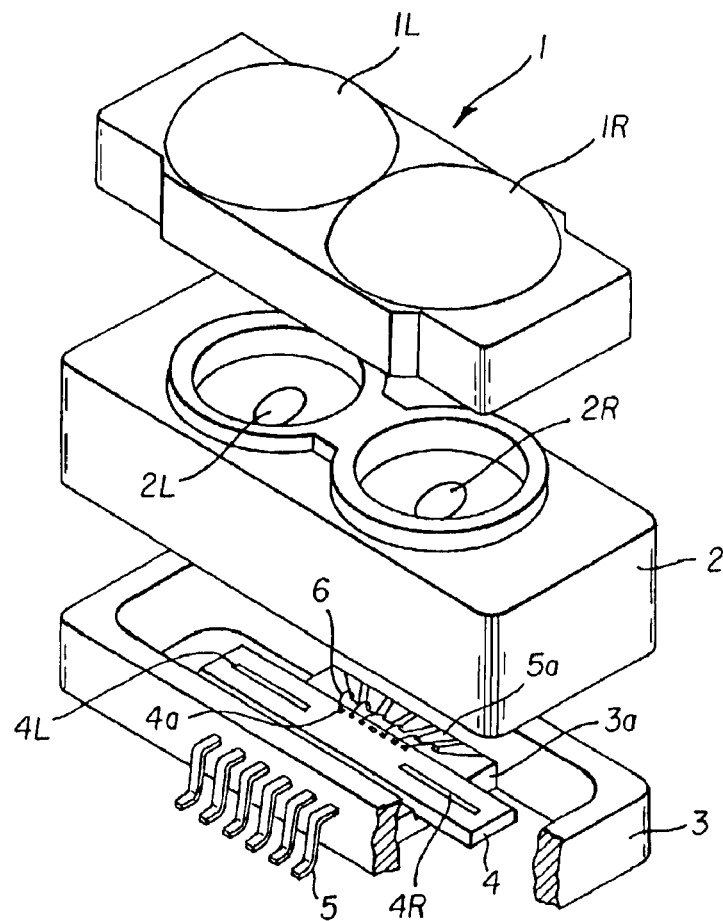
FIG. 3

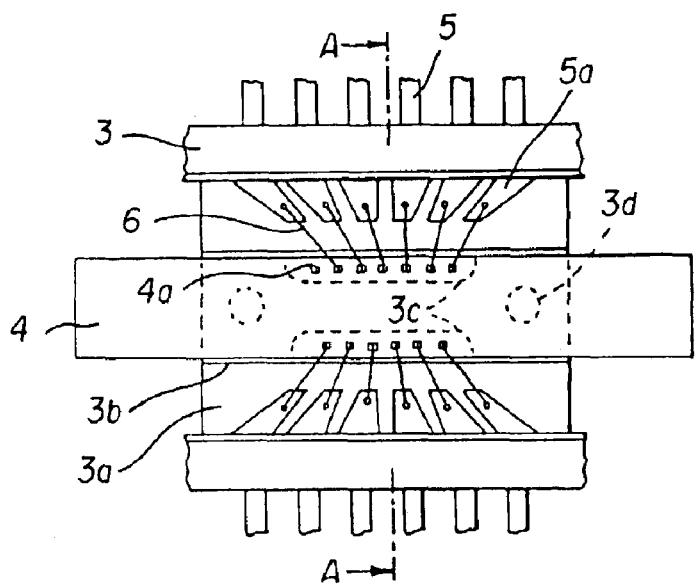
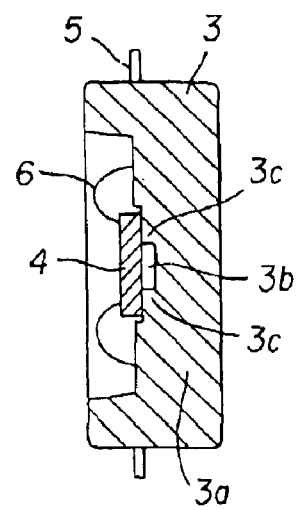
FIG. 5a
FIG. 5b
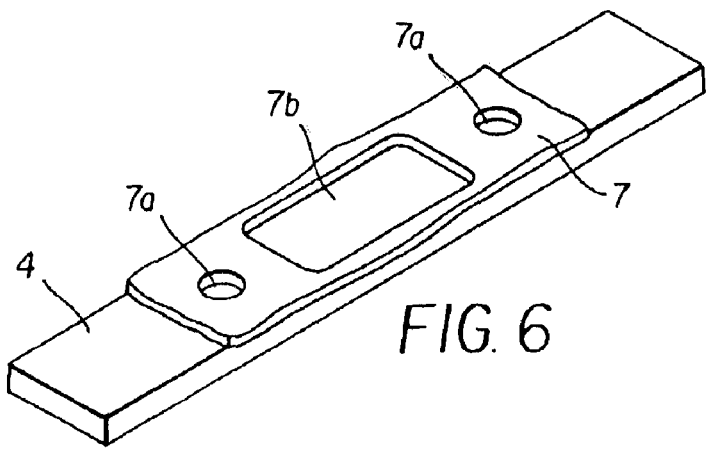
FIG. 6
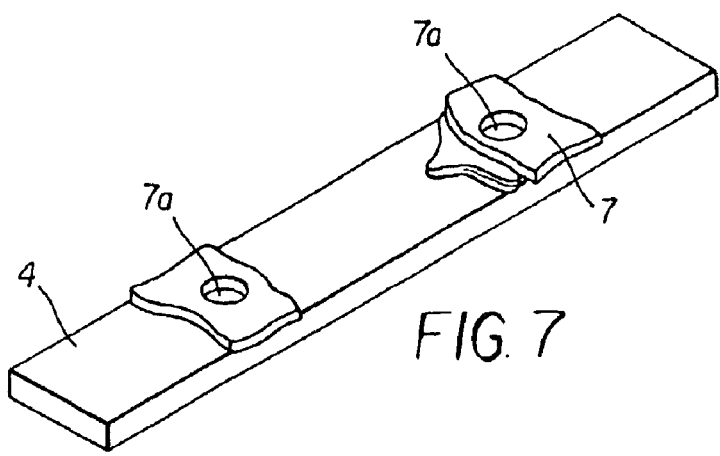
FIG. 7

SEMICONDUCTOR DEVICE MODULE

CROSS-REFERENCE TO RELATED APPLICATIONS

The present invention is a continuation-in-part of U.S. patent application Ser. No. 10/004,269 filed Oct. 24, 2001, now U.S. Pat. No. 6,583,433, laid open patent application Ser. No. 2002-0,084,432, laid open Jul. 4th, 2002, the disclosure of which is incorporated herein by reference.

BACKGROUND OF THE INVENTION

The present invention relates to a semiconductor device module used in a range finder module mounted an automatic focusing camera. Specifically, the present invention relates to the structure of a sensor stage that mounts a semiconductor optical sensor chip thereon.

FIG. 3 is an exploded perspective view showing the module structure of the related range finder disclosed by the present inventors in Japanese patent application No. 2001-328568, on which U.S. patent application Ser. No. 10/004,269 is based. Referring now to FIG. 3, the related range finder module includes an optical lens mount 1 including a pair of lenses 1L and 1R arranged side by side, an aperture mount 2 including a pair of aperture holes 2L and 2R corresponding to the lenses 1L and 1R, and a sensor stage 3 including a semiconductor optical sensor chip 4 mounted thereon. Hereinafter, the semiconductor optical sensor chip will be referred to simply as the "sensor chip". The sensor stage 3 is a package of a semiconductor device module housing the sensor chip 4. The optical lens mount 1, the aperture mount 2 and the sensor stage 3 are made of plastic. These constituent elements are piled up and bonded at the bonding planes thereof such that these constituent elements are assembled into a range finder module, the inside space thereof is filled with a transparent filler gel.

The sensor chip 4 is a rectangular plate, on which photosensor arrays 4L and 4R are aligned in the longitudinal direction of the sensor chip 4. Lead terminals (dual-in-lines) 5 are formed by insertion molding into the sensor stage 3 made of a resin. The sensor chip 4 is fixed with an adhesive at a predetermined location on a bottom wall 3a of the sensor stage 3. Electrode sections 4a (hereinafter referred to as "bonding pads") arranged along both sides of the central surface portion of the sensor chip 4 and inner lead sections 5a of the lead terminals 5 led out onto the bottom wall 3a of the sensor stage 3 are connected to each other via bonding wires 6. Windows formed on both sides of the bottom wall 3a of the sensor stage 3 function as injection ports, from which a transparent filler is injected into the range finder module when assembled.

The related structure of the sensor stage 3 will now be described more in detail below with reference to FIGS. 4(a) through 5(b). FIG. 4(a) is a perspective view of the sensor stage 3. FIG. 4(b) is a top plan view of the sensor stage 3. FIG. 5(a) is a top plan view of the sensor stage 3 with a sensor chip 4 mounted thereon. FIG. 5(b) is a cross section along A—A of FIG. 5(a). Referring now to these figures, a channel groove 3b, the lateral cross section thereof is shaped with a letter U, is formed in the central surface portion of the bottom wall 3a of the sensor stage 3. Hereinafter, the channel groove 3b will be referred to as the "U-groove". The width of the U-groove 3b is set corresponding to the width of the sensor chip 4. The sensor stage 3 includes a pair of pedestals 3c formed in the U-groove 3b along the side walls thereof, and pins 3d protruding from the both open end bottom portions of the U-groove 3b. The sensor chip 4 is mounted on the pedestals 3c.

The pedestals 3c work as receptacles when the bonding wires are connected to the bonding pads 4a on the sensor chip 4. The pedestals 3c facing to each other across the U-groove facilitate retaining the adhesive in the central potion of the U-groove. As shown in FIG. 5(a), the width of the pedestals 3c is set corresponding to the regions of the sensor chip 4, therein the bonding pads 4a are arranged. The pins 3d are disposed to prevent the sensor chip 4 mounted on the sensor stage 3 from slanting in the longitudinal direction thereof.

The sensor chip 4 is mounted on the sensor stage 3 in the following way. A thermosetting and UV-curing adhesive is coated on the U-groove 3b formed in the bottom wall 3a of a sensor stage 3. Then, a sensor chip 4 is pressed onto a predetermined location in the U-groove 3b. An ultraviolet ray is irradiated onto the sensor stage 3 with the sensor chip 4 put thereon to temporarily fix the sensor chip 4 at a predetermined location on the sensor stage 3. Then, the sensor chip 4 is finally fixed at the predetermined location on the sensor stage 3 by thermally setting the adhesive. The bonding wires 6 are connected between the inner lead sections 5a of the lead terminals 5 formed by insertion molding into the sensor stage 3 and the bonding pads 4a on the sensor chip 4.

The thermosetting and UV-curing adhesive is used to bond the sensor chip 4 accurately at the predetermined location on the sensor stage 3 efficiently and reliably. The sensor chip 4 is fixed accurately at the predetermined location on the sensor stage 3 temporarily by the UV-curing of the adhesive and tight adhesion is secured by the thermosetting. As described above with reference to FIGS. 4(a) through 5(b), the adhesive is provided with a certain thickness by securing a gap for retaining the adhesive in the central portion of the U-groove 3b by means of the pedestals 3c disposed along the respective side walls of the U-groove 3b and by filling the adhesive in the gap between the bottom of the U-groove 3b and the back surface of the sensor chip 4 mounted on the pedestals 3c so that displacement and parting of the sensor chip 4 caused by thermal expansion difference between the plastic sensor stage and the silicon sensor chip may be prevented from occurring. Thus, a very reliable range finder module is obtained.

The assembly process of mounting a sensor chip on the sensor stage having the related structure described above poses several problems. For example, in the step of coating an adhesive on the U-groove 3b formed in the bottom wall 3a of the sensor stage 3, the adhesive is coated also on the upper faces of the pedestals 3c formed stepwise along the side walls of the U-groove 3b. When a sensor chip 4 is pressed onto the sensor stage 3 in the subsequent mounting step, a part of the fluid adhesive coated on the U-groove 3b sometimes has no choice but to escape through the gaps left between U-groove 3b and the side edges of the sensor chip 4. The escaping adhesive splashes onto the upper faces of the bottom wall 3a and sticks to the inner lead sections 5a of the lead terminals 5 and the bonding pads 4a of the sensor chip 4. The amount of the adhesive in the central portion of the U-groove reduces due to the escape described above. The reduction in the adhesive amount causes voids between the sensor stage 4 and the bottom of the U-groove, leaving some back surface areas of the sensor chip 4 not bonded to the sensor stage 3.

FIG. 7 is a perspective view describing the adhesion defects on the back surface of the sensor chip mounted on the sensor stage as shown in FIGS. 5(a) and 5(b). First, a sensor chip 4 is mounted on a sensor stage 3 and the adhesive between the sensor chip 4 and the sensor stage 3 is cured. Then, the sensor chip 4 is removed from the sensor stage 3 and the sticking state of the adhesive 7 is observed. As described in FIG. 7, the adhesive 7 localizes to traces 7a corresponding to the pins 3d (cf. FIGS. 4(a) and 4(b)) formed in the sensor stage 3. A region with almost no adhesive sticking thereto is observed in the central portion on the back surface of the sensor chip 4. Furthermore, it has been observed that the adhesive sticking to the central portion on the back surface of the sensor chip 4 is cured insufficiently, since the ultraviolet ray irradiated downward onto the sensor stage 3 in the UV-curing step does not well reach the central portion on the back surface of the sensor chip 4, causing carriers of an insufficient amount.

Once the adhesion defects as described above are caused in the manufacturing process, the sensor chip 4 will part unexpectedly from the sensor chip 3 by the impact exerted to the range finder module, causing incapability of range finding and such troubles. Thus, the reliability of the range finder module is impaired.

In view of the foregoing, it would be desirable to provide a semiconductor device module having an improved chip mount structure that facilitates preventing adhesion defects from causing when a sensor chip is bonded to a sensor stage with an adhesive and improving the reliability thereof.

SUMMARY OF THE INVENTION

According to an aspect of the invention, there is provided a semiconductor device module that includes a sensor stage including a U-groove formed in an upper central surface portion of a bottom wall thereof and lead terminals formed by insertion molding on both sides of the U-groove, wherein an island-shaped flat pedestal is provided on a central bottom portion of the U-groove; and a semiconductor optical sensor chip bonded to the sensor stage with an adhesive coated in the U-groove, wherein the sensor chip includes electrode pads connected to the lead terminals via bonding wires and the sensor chip is bonded to the pedestal.

When an adhesive is coated on the U-groove including a pedestal disposed on the central bottom portion of the U-groove and a sensor chip is pressed onto a predetermined location on the pedestal, the adhesive expands to the space surrounding the pedestal and fills the space between the back surface of the sensor chip and the bottom of the U-groove. Since the spaces having no steps are left between the side walls of the U-groove and the pedestal, the adhesive provided with a way to escape does not splash to the outside. Therefore, the voids, which pose problems to the related semiconductor device module, are prevented from causing and a wide bonding area is obtained between the sensor chip and the sensor stage.

The adhesive is preferably a thermosetting and UV-curing adhesive. By employing primary UV-curing and secondary thermosetting, a higher adhesion strength is obtained.

The sensor stage according to the invention has a number of preferred structural details which facilitate mounting the semiconductor chip thereon. For example, the pedestal is preferably not so much narrower than the U-groove but wide enough to sustain the regions, therein the electrode pads are formed, along both sides of the sensor chip for making it sure to connect bonding wires to the electrode pads. Further, the side walls of the U-groove facing to the respective side edges of the sensor chip preferably slant to obtain wide gaps, through which an ultraviolet ray is irradiated to the wide area of the adhesive on the back surface side of the sensor chip. Still further, the sensor stage preferably includes supporting means, which support the sensor chip to prevent the sensor chip from slanting in the longitudinal direction thereof. The supporting means are preferably pins disposed on both sides of the pedestal and aligned in the longitudinal direction of the U-groove, and the pins are a little bit higher than the pedestal to leave a space for retaining the adhesive between the back surface of the sensor chip and the upper surface of the pedestal.

BRIEF DESCRIPTION OF THE DRAWING FIGURES

The invention will be described in greater detail with reference to the following detailed description of the preferred embodiments and the accompanying drawings, wherein:

FIG. 2(a) is a top plan view of the sensor stage according to the embodiment of the invention with a semiconductor optical sensor chip mounted thereon and FIG. 2(b) is a cross section along A—A of FIG. 2(a);

FIG. 3 is an exploded perspective view showing the module structure of the related range finder disclosed in Japanese Patent Application 2001-328568;

FIG. 5(a) is a top plan view of the related sensor stage with a semiconductor optical sensor chip mounted thereon and FIG. 5(b) is a cross section along A—A of FIG. 5(a);

FIG. 6 is a perspective view describing the state of the adhesive on the back surface of the sensor chip mounted on the sensor stage as shown in FIGS. 2(a) and 2(b) according to the invention; and FIG. 7 is a perspective view describing the state of the adhesive on the back surface of the sensor chip mounted on the sensor stage as shown in FIGS. 5(a) and 5(b) according to the related art.

DETAILED DESCRIPTION OF THE PREFERRED EMBODIMENTS

Figure 1A:
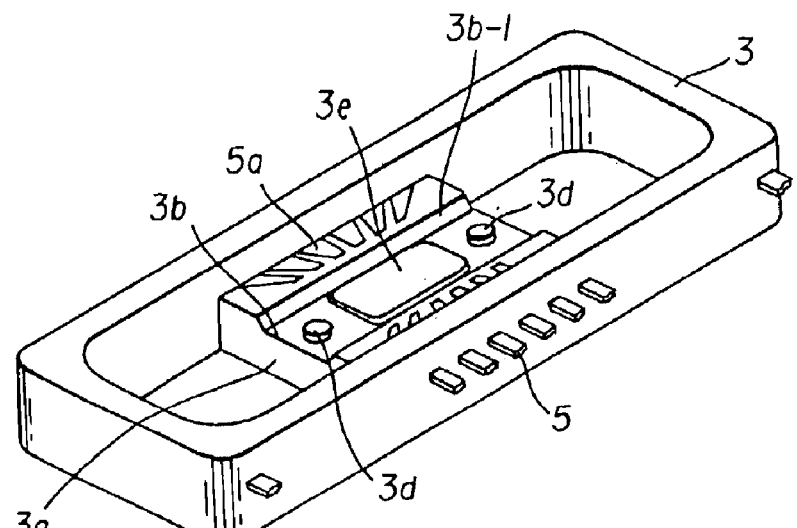
FIG. 1(a) is a perspective view of a sensor stage according to an embodiment of the invention and FIG. 1(b) is a top plan view of the sensor stage shown in FIG. 1(a)

The invention will be now explained hereinafter with reference to the accompanied drawing figures which illustrate the preferred embodiment of the invention. In the drawing figures which illustrate the preferred embodiment of the invention, the same reference numerals as used in FIGS. 4(a) through 5(b) are used to designate the same constituent elements and their explanations are omitted for the sake of simplicity.

Figure 1B:
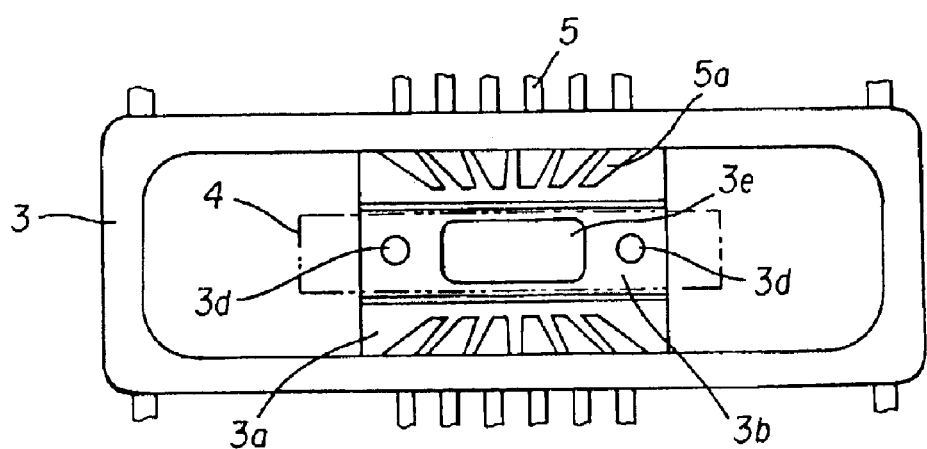
Figure 4A:
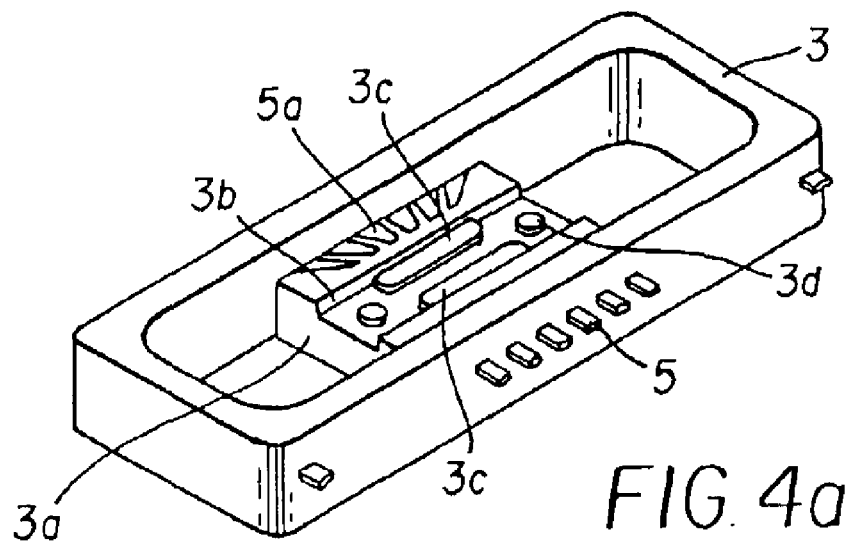
FIG. 4(a) is a perspective view of the related sensor stage and FIG. 4(b) is a top plan view of the related sensor stage.
Figure 4B:
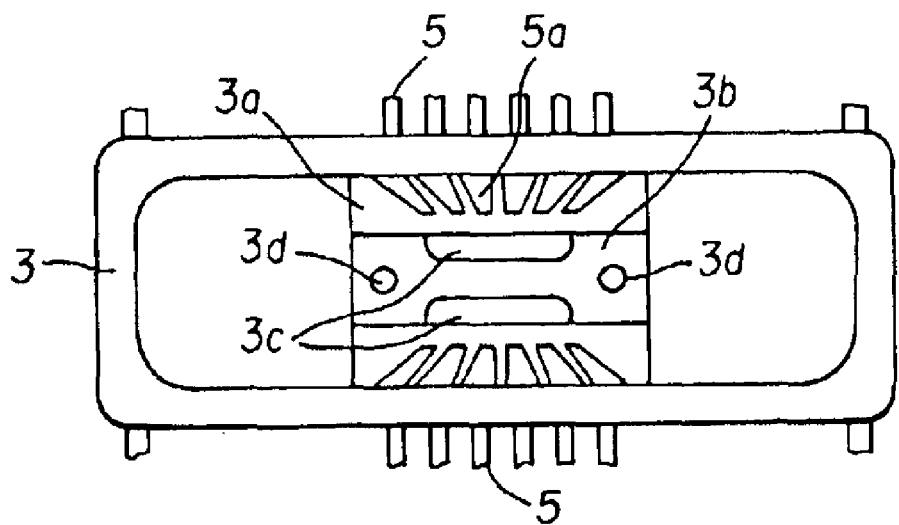

FIG. 1(a) is a perspective view of a sensor stage according to an embodiment of the invention. FIG. 1(b) is a top plan view of the sensor stage shown in FIG. 1(a). Referring now to these figures, the sensor stage 3 according to the embodiment includes a bottom wall 3a, a U-groove 3b formed in the surface portion of the bottom wall 3a, a rectangular-island-shaped flat pedestal 3e in the central portion of the U-groove 3b, and a pair of pins 3d on both sides of the rectangular pedestal 3e. The pins 3d are aligned in the longitudinal direction of the U-groove 3b. One of the specific features of the sensor stage 3 according to the invention is the rectangular-island-shaped flat pedestal 3e formed in the central portion of the U-groove 3b in substitution for a pair of the related pedestals 3c formed along the respective side walls of the U-groove 3b. Another specific feature of the sensor stage 3 according to the invention is the slanted side walls 3b-1 of the U-groove 3b facing opposite to the respective side edges of the pedestal 3e. The side walls of the U-groove 3b in the related sensor stage extend in perpendicular to the bottom surface of the U-groove 3b In contrast, the side walls 3b-1 of the U-groove 3b in the sensor stage according to the invention are slanted such that the cross section of the U-groove 3b parallel to the bottom surface thereof becomes wider toward the opening of the U-groove 3b.

The pedestal 3e is designed to be a little narrower than the U-groove 3b but to be wide enough to sustain both side regions where bonding pads 4a are formed, on the sensor chip 4. Pins 3d, disposed to prevent the sensor chip 4 from slanting in the longitudinal direction thereof, are set to be as high as the pedestal 3e or to be a little bit higher, e.g. by 100 μm or shorter, than the pedestal 3e to leave a space for retaining the adhesive in the gap between the back surface of the sensor chip 4 and the upper surface of the pedestal 3e.

A thermosetting and UV-curing adhesive is coated on the U-groove 3b formed in the bottom wall 3a of a sensor stage 3 in the same way as according to the related art. When a sensor chip 4 is pressed onto a predetermined location in the U-groove 3b, the adhesive expands to the space surrounding the pedestal 3e. Since deep spaces are left between the side walls 3b-1 of the U-groove 3b and the pedestal 3e and since the side walls 3b-1 of the U-groove 3b are slanted such that the cross section of the U-groove 3b parallel to the bottom surface thereof becomes wider upward, adhesive retainer spaces of a large volume are left between the side walls 3b-1 of the U-groove 3b and the pedestal 3e.

The adhesive is therefore prevented from escaping through the gaps between U-groove 3b and the side edges of the sensor chip 4 and splashing to the outside. The adhesive is retained within the U-groove 3b. Due to the scheme described above, the adhesive of an insufficient amount is prevented from coating the back surface of the sensor chip 4 and, therefore, voids are prevented from being caused in the bonding plane between the sensor chip 4 and the pedestal 3e. Thus, a wide bonding area, across which the sensor chip 4 is bonded securely to the pedestal 3e, is obtained.

By setting the width of the pedestal 3e as described above, the side regions of the sensor chip 4 for the bonding pads 4a are sustained by the pedestal 3e and wire bonding is conducted with no problem.

Since the gaps between the sensor chip 4 and the side walls of the U-groove 3b are expanded by the provision of the slanted side walls 3b-1, an ultraviolet ray is irradiated onto a wide adhesive area. Therefore, the ultraviolet ray irradiated downward onto the sensor stage 3 is guided efficiently toward the back surface side of the sensor chip 4, and the adhesive on the back surface side of sensor chip 4 is cured effectively by UV-curing.

Strong adhesion strength is obtained by further curing the main portion of the adhesive by the thermosetting conducted after the UV-curing. Although the similar effects may be obtained according to the related art, the properties of the thermosetting and UV-curing adhesive are utilized effectively and the final adhesion strength is improved according to the invention.

FIG. 6 is a perspective view describing the state of the adhesive on the back surface of the sensor chip mounted on the sensor stage as shown in FIGS. 2(a) and 2(b) according to the invention. First, a sensor chip 4 is mounted on a sensor stage 3 and an adhesive between the sensor chip 4 and the sensor stage 3 is cured. Then, the sensor chip 4 is removed from the sensor stage 3 and the sticking state of the adhesive 7 is observed. In FIG. 6, traces 7a corresponding to the pins 3d and a trace 7b corresponding to the pedestal 3e are shown. As observed in FIG. 6, the adhesive 7 is sticking uniformly to the back surface region on the sensor chip 4 surrounding the pedestal 3e and the pins 3d. Any adhesion defect as described with reference to FIG. 7 is not observed.

Although the invention has been described in connection with the embodiment of a sensor stage used in range finder modules, the invention is applicable also to the semiconductor device module which mounts an image sensor and such a semiconductor chip on a plastic package.

As described above, the semiconductor device module according to the invention, including a sensor stage and a semiconductor optical sensor chip mounted on the sensor stage, the semiconductor device module converting the images of an object focused on the sensor chip to electrical signals; the sensor stage being made of a plastic, the sensor stage including a U-groove formed in the upper central surface portion of the bottom wall thereof and lead terminals formed by insertion molding on both sides of the U-groove, the sensor chip being bonded to the sensor stage with an adhesive coated in the U-groove, and the sensor chip including electrode pads connected to the lead terminals via bonding wires, includes an island-shaped flat pedestal on the central bottom portion of the U-groove for mounting the sensor stage thereon.

The semiconductor device module according to the invention having the structure described above facilitates preventing the splashing of the adhesive, which poses problems to the related chip mount structure, from causing, preventing the voids caused by the splashing of the adhesive from occurring in the chip bonding plane, securing a wide bonding area between the sensor chip and the sensor stage, and bonding the sensor chip tightly onto the sensor stage.

The slant side walls of the U-groove according to the invention widen the area, irradiated by an ultraviolet ray, of the adhesive on the back surface side of the sensor chip to facilitate efficient UV-curing.

By assembling the semiconductor device module according to the invention, an optical lens mount and an aperture amount into a unit, a very reliable range finder module is obtained.

What is claimed:

1. A semiconductor device module comprising: a sensor stage including a U-groove formed in an upper central surface portion of a bottom wall thereof and lead terminals formed by insertion molding on both sides of the U-groove, wherein an island-shaped flat pedestal is provided on a central bottom portion of the U-groove; and a semiconductor optical sensor chip bonded to the sensor stage with an adhesive coated in the U-groove, wherein the sensor chip includes electrode pads connected to the lead terminals via bonding wires and the sensor chip is bonded to the pedestal.

2. The semiconductor device module according to claim 1, wherein the adhesive comprises a thermosetting and UV-curing adhesive.

3. The semiconductor device module according to claim 1, wherein the pedestal is narrower than the U-groove but wide enough to sustain regions in which the electrode pads are formed along both sides of the sensor chip.

4. The semiconductor device module according to claim 1, wherein the side walls of the U-groove facing to respective side edges of the pedestal are slanted.

5. The semiconductor device module according to claim 1, wherein the sensor stage further comprises supporting means for supporting the sensor chip to prevent the sensor chip from slanting in the longitudinal direction thereof.

6. The semiconductor device module according to claim 5, wherein the supporting means comprise pins disposed on both sides of the pedestal and aligned in the longitudinal direction of the U-groove, wherein the pins are higher than the pedestal.

7. The semiconductor device module according to claim 1, wherein the semiconductor device module is a part of the range finder module including an optical lens mount and an aperture mount.

* * * * *